(12) United States Patent
Okazaki et al.

(10) Patent No.: US 6,496,332 B1
(45) Date of Patent: Dec. 17, 2002

(54) HEAD SLIDER FOR FLEXIBLE MAGNETIC DISK

(75) Inventors: Yutaka Okazaki, Tokyo (JP); Naoto Kojima, Kanagawa (JP); Hiroyuki Ryoson, Kanagawa (JP); Kazuo Goto, Kanagawa (JP)

(73) Assignees: Sony Corporation, Tokyo (JP); Daido Tokushuko Kabushiki Kaisha, Nagoya (JP)

( * ) Notice: Subject to any disclaimer, the term of this patent is extended or adjusted under 35 U.S.C. 154(b) by 150 days.

(21) Appl. No.: 09/655,358

(22) Filed: Sep. 5, 2000

(30) Foreign Application Priority Data

Sep. 6, 1999 (JP) .............................................. 11-251815

(51) Int. Cl.$^7$ ................................................ G11B 5/58
(52) U.S. Cl. ............................... 360/246.2; 360/246.4; 360/237
(58) Field of Search .......................... 360/234.2, 237.1, 360/235.8, 236.3, 236.6, 237, 246.1, 246.2

(56) References Cited

U.S. PATENT DOCUMENTS

| 6,023,393 A | * | 2/2000 | White ...................... 360/236.6 |
| 6,097,576 A | * | 8/2000 | Fukuchi et al. .......... 360/246.2 |
| 6,115,219 A | * | 9/2000 | Hall ......................... 360/234.2 |
| 6,160,682 A | * | 12/2000 | Yamazaki et al. ....... 360/234.7 |

* cited by examiner

*Primary Examiner*—Jefferson Evans
(74) *Attorney, Agent, or Firm*—Frommer Lawrence & Haug LLP; William S. Frommer; Matthew K. Ryan

(57) ABSTRACT

A head slider for a flexible magnetic disk has a magnetic pole pad including a magnetic head buried in the pad and being disposed on a surface of the head slider opposed to the flexible magnetic disk, and the magnetic head performs the recording of a signal on the flexible magnetic disk or the reproducing of the signal from the flexible magnetic disk in a state that the pad contacts the flexible magnetic disk rotating at a relative speed of 0 m/s to 25.0 m/s to the magnetic head.

17 Claims, 18 Drawing Sheets

HEAD SLIDER FOR FLEXIBLE MAGNETIC DISK

BACKGROUND OF THE INVENTION

1. Field of the Invention

A head slider for a flexible magnetic disk according to the present invention relates to a slider of a magnetic head for performing record to and/or reproduction from the flexible magnetic disk made of a resin substrate on which a magnetic layer is formed, in particular, relates to a technique for realizing a flexible magnetic disk having a higher density and the transfer rate of data at a higher speed together with aiming lower power consumption.

2. Description of the Related Art

Recently, as the performance of a computer is improved and various application areas of the flexible magnetic disk such as a digital camera expand, the recording density of a removable flexible magnetic disk represented by a 3.5-inch floppy disk is increased. Consequently, the improvement of a data transfer rate by means of a change of the speed of revolution of the flexible magnetic disk to be high is required.

On the other hand, from a point of view for loading on a portable personal computer, there is conversely required a head slider capable of performing stable record and stable reproduction under a condition of a low speed of revolution of the flexible magnetic disk where the consumption electric power of a flexible magnetic disk apparatus can be saved, and capable of performing the stable record and the stable reproduction with a low frictional force because the strength of the frictional force between a magnetic head and the flexible magnetic disk directly influences the consumption electric power.

That is, a technique realizing securement of a soft and stable contact between the magnetic head and the flexible magnetic disk in a wide range from a low speed of revolution to a high-speed of revolution and realizing a head slider with a low frictional force and high reliability is regarded as an object for a next generation flexible magnetic disk.

For accomplishing such an object, the following can be considered.

1. Changing the speed of revolution of a flexible magnetic disk to be high by means of a magnetic head and a head slider to be used for an existing 3.5-inch floppy disk.
2. Using a magnetic head and a head slider to be used for a hard disk.

<AS FOR THE ITEM 1>

In a conventional so-called 3.5-inch floppy disk apparatus that performs record and reproduction at a speed of revolution of 300 rpm and has a capacity of 1.4 Mbytes, the load force of a head slider is about 20,000 mgf, and a frictional force to be produced reaches about 10,000 mgf. Accordingly, for scheming a change of the consumption electric power to be low, it is required to reduce the load force at first for reducing the frictional force.

On the other hand, if the number of revolution is increased for changing a transfer rate to be high though the head slider is urged to the flexible magnetic disk with such a high load force, a floating force is given to the head slider, and thereby the so-called magnetic spacing amount that is a space between the magnetic head and the flexible magnetic disk is increased. The phenomenon is considered to happen owing to an air film lubrication effect because a portion of the outer edge of the head slider beveled to a smooth curved surface called as "blend R" acts just similarly to a taper of a head slider for a floating type hard disk.

Because the increase of the magnetic spacing amount brings about a problem of the deterioration of an overwrite characteristic owing to the increase of a pulse width (PW 50), the lowering of an isolated reproduction wave output (IS TAA) and the lowering of the magnetic field strength, it becomes very hard to change the line density of the flexible magnetic disk to be high and to change the transfer rate of the flexible magnetic disk to be high.

If the magnetic head is made to contact the flexible magnetic disk with the load force simply increased for avoiding the problem, such a problem is produced in turn as dangerousness of lowering of reliability and durability owing to the abrasion of a magnetic head and the abrasion of the magnetic flexible disk at the time of the low speed of revolution of the disk. And then, even if the abrasion resistance of the flexible magnetic disk can be improved, a problem that the consumption electric power of the flexible magnetic disk apparatus is inevitably increased is produced.

<AS FOR THE ITEM 2>

Accordingly, various new flexible magnetic disk apparatuses recently enter the stage for avoiding those problems. Those apparatus employ the so-called floating type head slider having a taper flat structure that produces a positive pressure and further having a negative pressure structure similarly to that used for a hard disk. The floating type head slider can perform high-speed record and reproduction, with a stable low magnetic spacing amount of 40 nm–100 nm being kept without almost any contact to the flexible magnetic disk. The number of revolution of the flexible magnetic disk of the new flexible magnetic disk apparatus is about 3,000 rpm, the relative speed thereof is about 13.2 m/s, and the recording density thereof is about 100 $Mbpi^2$–200 $Mbpi^2$.

Now, for changing the recording density of such a flexible magnetic disk apparatus to be higher and for changing the transfer rate thereof to be higher, the magnetic spacing amount should be decreased to be 40 nm or less under a higher line speed.

However, the flatness of the flexible magnetic disk is inferior to that of the hard disk, the amount of the repeatable run-out (RRO) is several times to one digit as large as that of the hard disk. Furthermore, because the bending rigidity of the flexible magnetic disk is low, the flexible magnetic disk is sensitive to a deformation induced by external vibrations and non-repeatable run-out (NRRO) owing to vibrations. Consequently, it is difficult to keep the magnetic spacing amount between a magnetic head embedded in a slider rail and the flexible magnetic disk to a fixed value of 40 nm or less. As a result, a problem that the variation of signal outputs is large and the flexible magnetic disk apparatus becomes unstable is produced.

In addition, in this case, it is inevitable that the head slider frequently contacts the flexible magnetic disk. Then, abrasion powder of the flexible magnetic disk and the head produced by repeating partial contact between them attaches the head slider portion. Consequently, the stability of floating of the head slider is gradually damaged owing to the attached powder and the like. And then, the head slider itself begins to vibrate with the increment of pollution thereof. At last, a hard error occurs owing to head crush or an eternal damage of the flexible magnetic disk.

Besides, even if the slider rail is driven to run in a state of being completely contacted with the flexible magnetic disk for suppressing the aforesaid phenomena by means of the increment of the load force or the like, the abrasion of the flexible magnetic disk and the magnetic head becomes large because of a tendency that the contact pressure at a rear part of the head slider, which is a feature of the floating posture of the head slider, becomes very large. Thus, from this point of view, a problem that it is difficult to maintain the reliability for a long time occurs.

Furthermore, because the head slider does not float owing to the lost of the air film lubrication effect in a region of a small number of revolutions necessary for changing the consumption electric power to be low, a problem that the frictional force unexpectedly increases and the reliability cannot be maintained is produced.

As the aforementioned, the present situation of the performance of the flexible magnetic disk apparatus of the prior art is limited to a degree that the number of revolution of the flexible magnetic disk is about 3,000 rpm and an average recording surface density is about 200 $Mbpi^2$.

SUMMARY OF THE INVENTION

Accordingly, the present invention concerns a slider of a magnetic head for performing record to and/or reproduction from a flexible magnetic disk made of a resin substrate on which a magnetic layer is formed, and aims to realize a flexible magnetic disk having a high density and the transfer rate of data at a higher speed together with aiming low power consumption.

For resolving the aforesaid problems, according to an aspect of the present invention, there is provided a head slider for a flexible magnetic disk that has a pad, in which a magnetic head is embedded, disposed on a face of the head slider opposed to the flexible magnetic disk, wherein the magnetic head performs the recording of a signal on the flexible magnetic disk or the reproducing of the signal from the flexible magnetic disk in a state that the pad contacts the flexible magnetic disk rotating at a relative speed in a range of 0 m/s to 25.0 m/s to the magnetic head.

Consequently, the head slider for a flexible magnetic disk of the aspect of the present invention has no floating mechanism including a taper flat or a negative pressure mechanism like a conventional head slider for a hard disk, recording and reproducing with the magnetic head can stably done over a wide range of relative speed from a low speed to a high speed for a long term in a state that the head slider contacts the surface of the flexible magnetic disk. Consequently, the head slider can realize a change of the flexible magnetic disk to be a high density one and a change of a transfer rate to be a high speed one, and further the head slider can change the consumption electric power to be low.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which.

DESCRIPTION OF THE PREFERRED EMBODIMENTS

Figure 1:
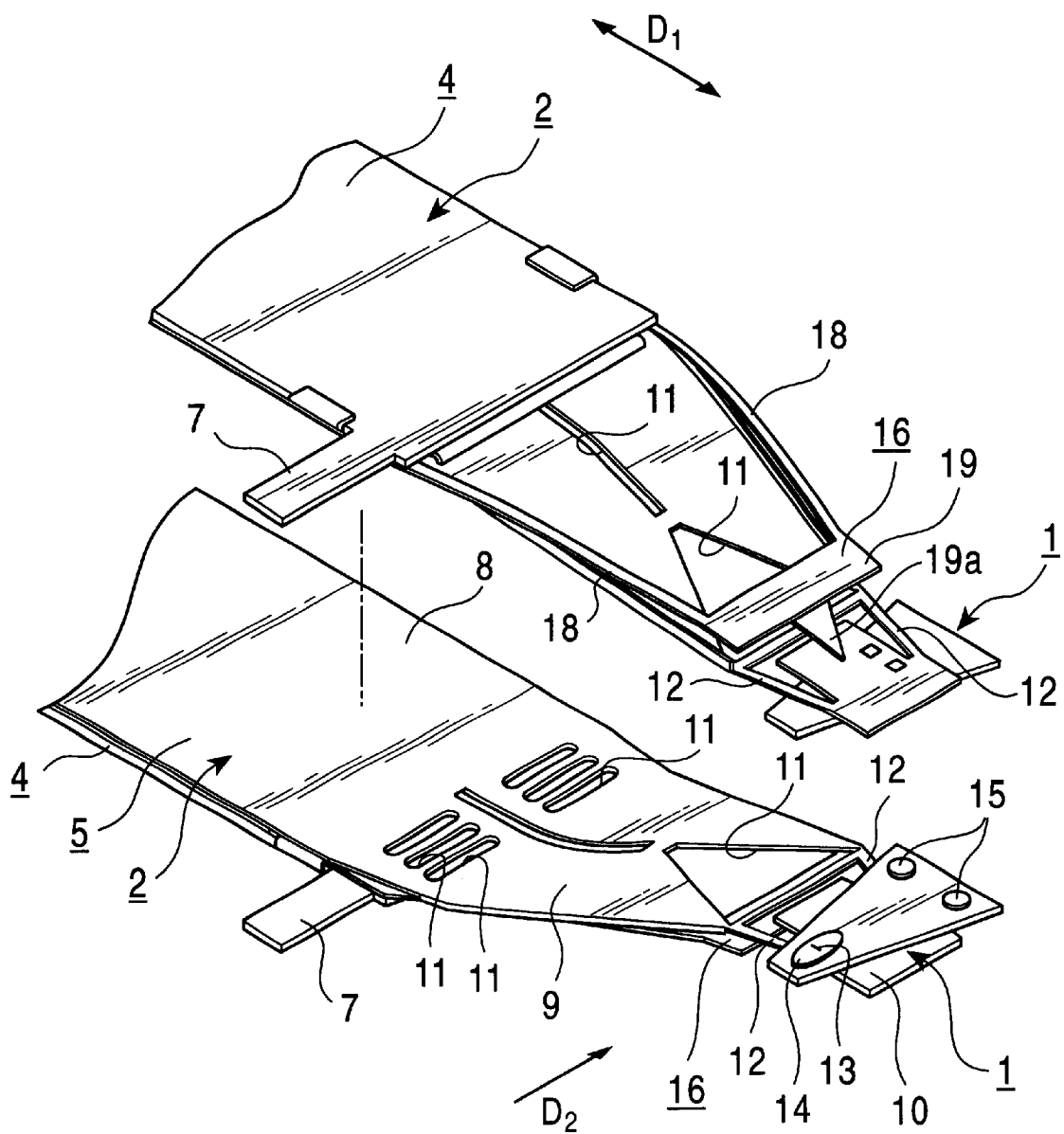
FIG. 1 is a perspective view showing enlargedly a tip of a head gimbals assembly (hereafter abbreviated to "HGA"), together with FIGS. 2–15, which is freely movable in a radial direction of a flexible magnetic disk, and at the tip of which a head slider for the flexible magnetic disk according to the present invention is supported.

Attached drawings are referred below while an embodiment of a head slider for a flexible magnetic disk according to the present invention is described.

Such an embodiment is equipped with the head slider for the flexible magnetic disk according to the present invention supported at a tip of a head slider suspension, or the HGA, movable freely in a radial direction of the flexible magnetic disk with a close coupled type actuator.

FIGS. 1–15 show HGA's 2 at a tip of which a head slider 1 is attached, respectively. The HGA's 2 are respectively composed of a base plate 4 having a shape of rectangular plate elongated along an extended direction of a radial direction of a flexible magnetic disk 3 and a suspension beam 5 affixed on the bottom surface of a tip portion of the base plate 4 in a state of superposition. The head sliders 1 are supported at the tip portions of the suspension beams 5.

Incidentally, two head sliders 1 and two HGA's 2 are disposed so as to be opposed to each other in a vertical direction, respectively. The pairs of the head sliders 1 and the HGA's 2 are made to hold the flexible magnetic disk 3 on its both surfaces. However, the following description will be given only to the upper head slider 1 and HGA 2 and the description about the lower ones will be omitted except for a case where they will specially be mentioned.

Figure 2:
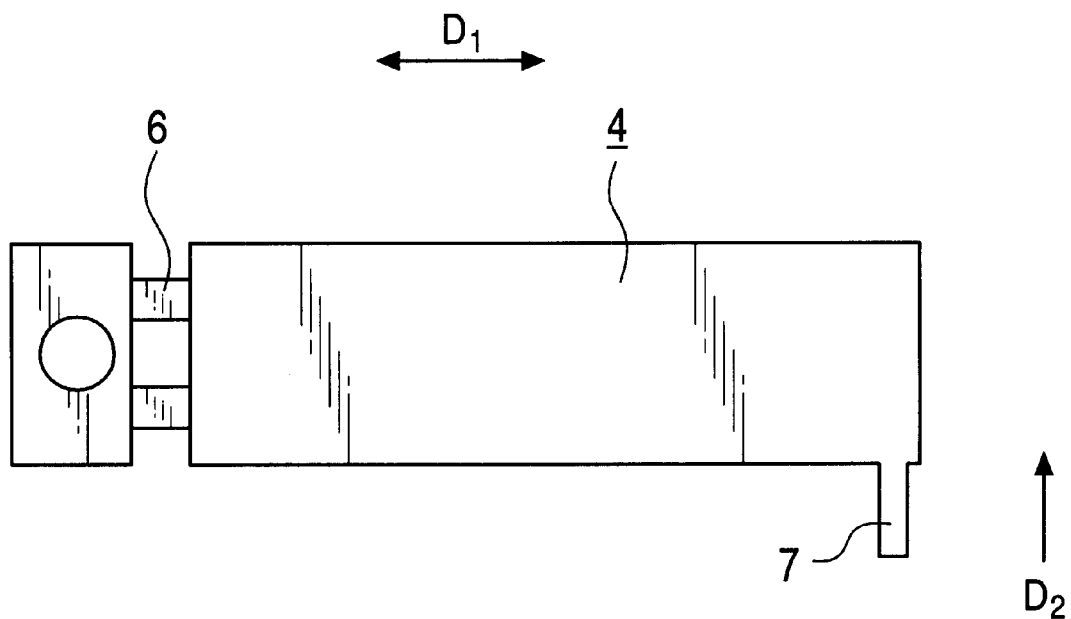
FIG. 2 is a plan view showing a base plate shown in FIG. 1 enlargedly.
Figure 3:
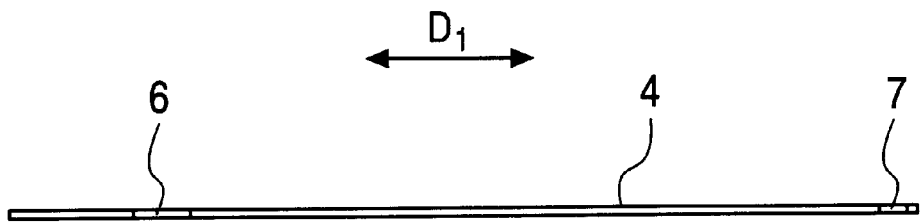
FIG. 3 is a side view showing the base plate shown in FIG. 1 enlargedly.

FIGS. 2 and 3 show the base plate 4 for supporting the suspension beam 5. FIG. 2 is a plan view thereof. FIG. 3 is a side view thereof.

A narrow portion 6 constricted from the right side and the left side of the base plate 4 is formed at a base portion of the base plate 4. The portion on a side nearer to the base portion than the narrow portion 6 is held by a not shown carriage of a linear motor. In addition, a cantilever arm portion 7 projecting to one side perpendicularly from one of the right side and the left side of a tip portion of the base plate 4 is formed to be one body with the base plate 4.

Moreover, when the cantilever arm portion 7 is relatively lifted by a lifter owing to the back-and-forth movement of the linear motor, though it is not shown, the base plate 4 has a tendency of being bent at the narrow portion 6, and then the tip portion of the base plate 4 is lifted upward with its posture keeping substantially flat without being twisted though it is lifted at its one side edge.

Incidentally, the "$D_1$ direction" shown in the drawings is the back-and-forth movement direction of the linear motor, and also a direction of a seek direction for recording or reproducing by the magnetic head. Moreover, the "$D_2$ directions" in the drawings shows the running direction, or revolution direction, of the flexible magnetic disk 3. Such a running direction ($D_2$) of the flexible magnetic disk may be the counter direction.

Furthermore, the not shown liner motor moves in parallel to a radial direction of the flexible magnetic disk 3, and the base plate 4 is made to move in an extended direction of the radial direction of the flexible magnetic disk 3 by being driven by the linear motor.

Figure 4:
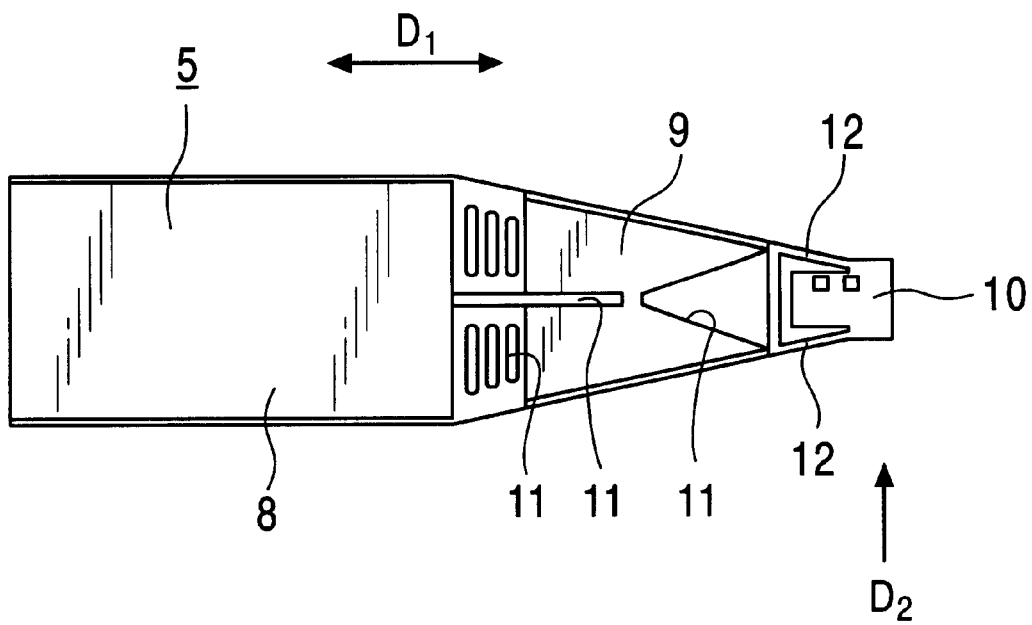
FIG. 4 is a plan view showing a suspension beam shown in FIG. 1 enlargedly.
Figure 5:
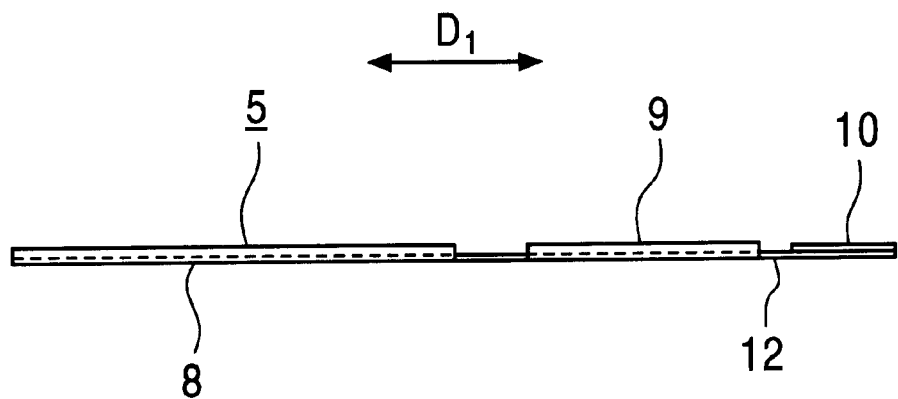
FIG. 5 is a side view showing the suspension beam shown in FIG. 1 enlargedly.

FIGS. 4 and 5 show the suspension beam 5. FIG. 4 is a plan view thereof. FIG. 5 is a side view thereof.

The suspension beam 5 is composed of an affixed portion 8 to be affixed to the bottom surface of the tip portion of the base plate 4 by being actuated by a pivot spring that will be described later, a suspension portion 9 the width of which becomes narrower as its position approaches the tip of the suspension portion 9, and a slider-supporting portion 10 for supporting the head slider 1 at the tip portion of the suspension portion 9.

Several apertures 11 are formed in the suspension portion 9, and moderate elasticity is thereby given to the suspension portion 9. In particular, a link portion 12 having a shape of a rectangle without one side at the tip thereof is formed at the tip portion of the suspension portion 9. The substantially rectangular slider-supporting portion 10 is formed between both of the ends of the link portion 12.

The suspension beam 5 is made from a very soft laminate material composed of three layers of, e.g. SUS, an adhesive agent and SUS in the order and having a spring constant of about 200 mgf/mm. In addition, the link portion 12 of the tip portion keeps the softness of the roll direction rigidity of 0.2 $\mu$N·m/degree and the pitch direction rigidity of 0.04 $\mu$N·m/degree.

Furthermore, though the detail thereof is not described, the suspension beam 5 is mechanically connected to the back surface of the head slider 1 and also connected electrically to a terminal of a lead extended from a magnetic head embedded at the center of a magnetic pole pad that will be described later for serving also the function as a signal line.

Figure 11:
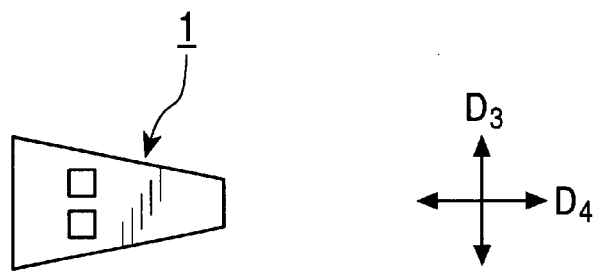
FIG. 11 is a plan view showing the head slider, which is shown in FIG. 1, together with FIGS. 12–15.
Figure 12:
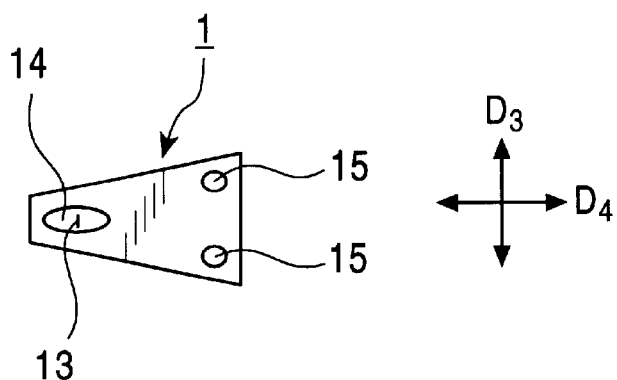
FIG. 12 is a bottom view showing the head slider shown in FIG. 11 viewed from the surface contacting the flexible magnetic disk shown in FIG. 1.
Figure 13:
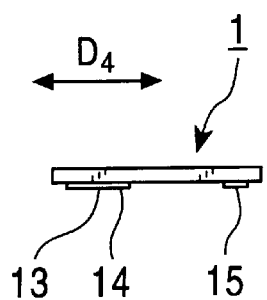
FIG. 13 is a side view showing enlargedly the head slider shown in FIG. 11.
Figure 14:
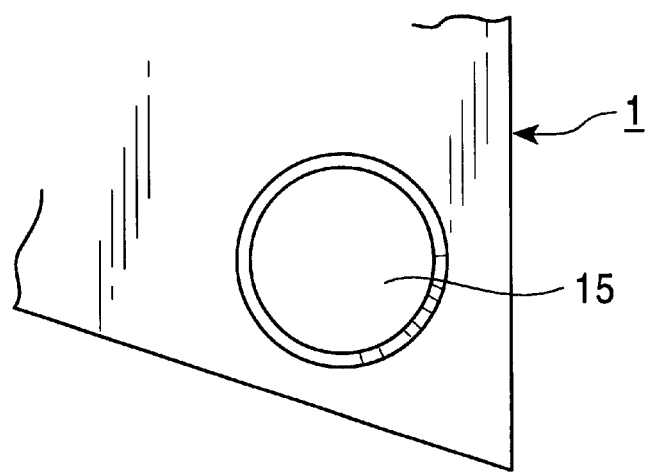
FIG. 14 is a bottom view showing the contact pad shown in FIG. 1.

FIGS. 11–13 show the head slider 1. FIG. 11 is a plan view thereof. FIG. 12 is a bottom view thereof viewed from the disk-contacting surface side. FIG. 13 is a side view thereof. The head slider 1 has a planar shape of a portrait trapezoid. A magnetic head 13 is embedded at the taper portion of the head slider 1. The contact pad 14 or a magnetic pole pad is supported at the taper portion. In addition, contact pads 15 are supported at the corners on the opposite side of the contact pad 14.

The head slider 1 is formed to be an alumina body or the like made by being spattered in a thin film process. Because the thickness of the head slider 1 is extremely thin to be 50 $\mu$m or less, the rigidity of the head slider 1 is very small in comparison with that of a pico slider having the thickness of about 300 $\mu$m for a hard disk apparatus, and the tare of the head slider 1 is light to be 500 $\mu$g or less. As a result, the head slider 1 can follow the surface of the flexible magnetic disk 3 smoothly. Moreover, because the head slider 1 is extremely light, the head slider 1 generates very weak force on the basis of the acceleration imposed from the outside. As a result, the head slider 1 is superior in impact resistance that is sometimes important in a portable use.

The contact pads 14 and 15 are made from diamond-like carbon (hereafter abbreviated to "DLC") or the like. A magnetic head 13, which has a magnetic gap, for performing record/reproduction is embedded in the contact pad 14. The periphery of the magnetic core of the magnetic head 13 is enclosed by DLC or the like on the sliding surface of the magnetic head 13.

The degree of hardness of the contact pads 14 and 15 needs to be 700 or more in Vickers hardness from a point of view of the abrasion resistance, preferably 1,000 or more in Vickers hardness. The material of the contact pads 14 and 15 is not limited to the DLC. Any material having the aforesaid characteristics may also be applicable.

Figure 15:
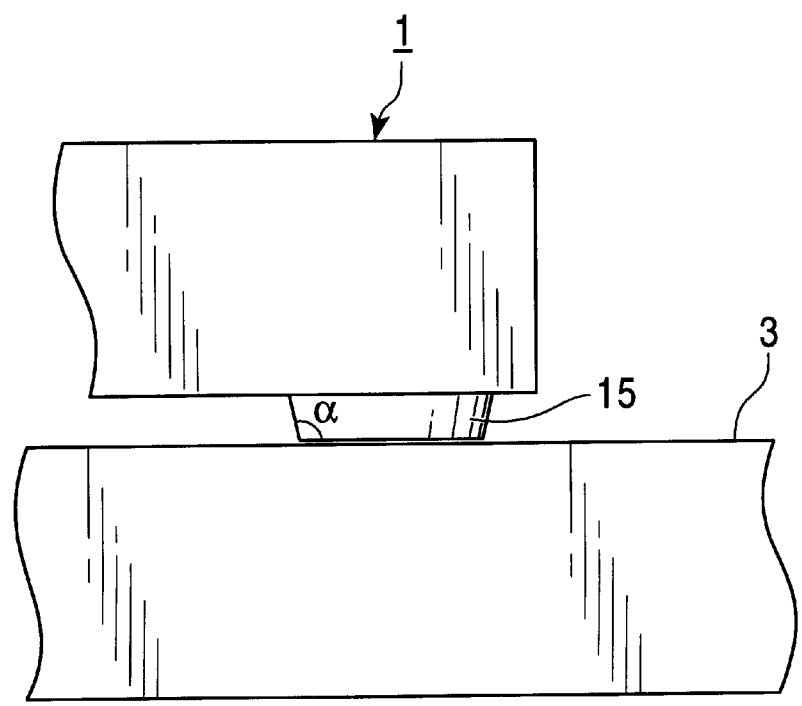
FIG. 15 is a side view showing enlargedly a state that the contact pad, which is shown in FIG. 14, contacts the flexible magnetic disk.

An angle α of each of corner portions of the contact pads 14 and 15 on the side of contacting the flexible magnetic disk 3 shown in FIG. 15 needs to be an obtuse angle that is 90 degrees or more for suppressing the scrape to the flexible magnetic disk 3, preferably it is 115 degrees or more. The reasons of this will be described later.

Furthermore, the shape of the sliding surface of the contact pad 14 is formed to be an ellipse, and the shapes of the sliding surfaces of the contact pads 15 are formed to be a circle. However, the shapes of the contact pads of the present invention are not limited to the aforesaid shapes. Any of the shapes of a rectangle, a square, and a triangle may be applicable.

The so-called planer type thin film inductive head the windings of which is parallel to the surface of the head slider 1 is employed as the magnetic head 13 for housing the structure of the magnetic head 13 in the thin head slider 1. However, the magnetic head 13 of the invention is not limited to the type.

Two quadrilateral portions shown in the vicinity of the center of the head slider 1 of FIG. 11 are portions for connecting the electric terminals of the magnetic head 13 to a supporting body. The quadrilateral portions are portions for connecting electrically a portion as a signal line of the suspension beam 5 and a terminal of a lead extended from the magnetic head 13.

Then, the head slider 1 like this is affixed to the bottom surface of the slider-supporting portion 10 at the tip of the suspension beam 5.

Figure 6:
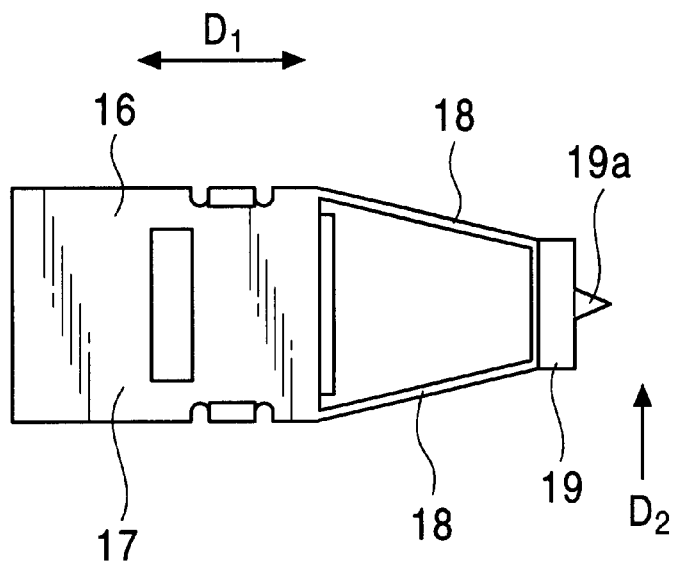
FIG. 6 is a plan view showing a pivot spring shown in FIG. 1 enlargedly.
Figure 7:
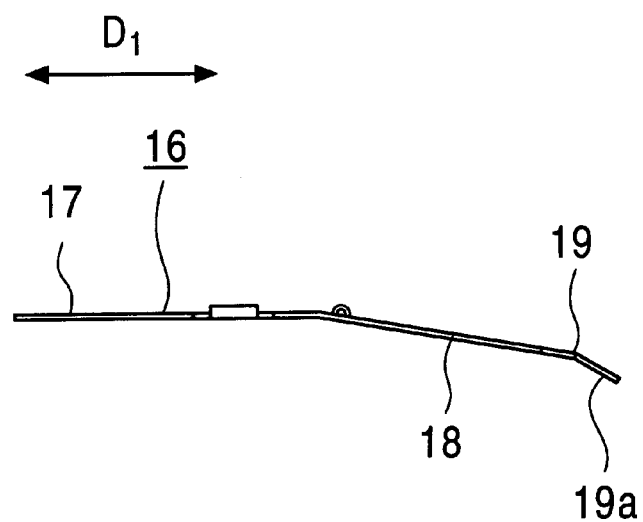
FIG. 7 is a side view showing the pivot spring shown in FIG. 1 enlargedly.
Figure 8:
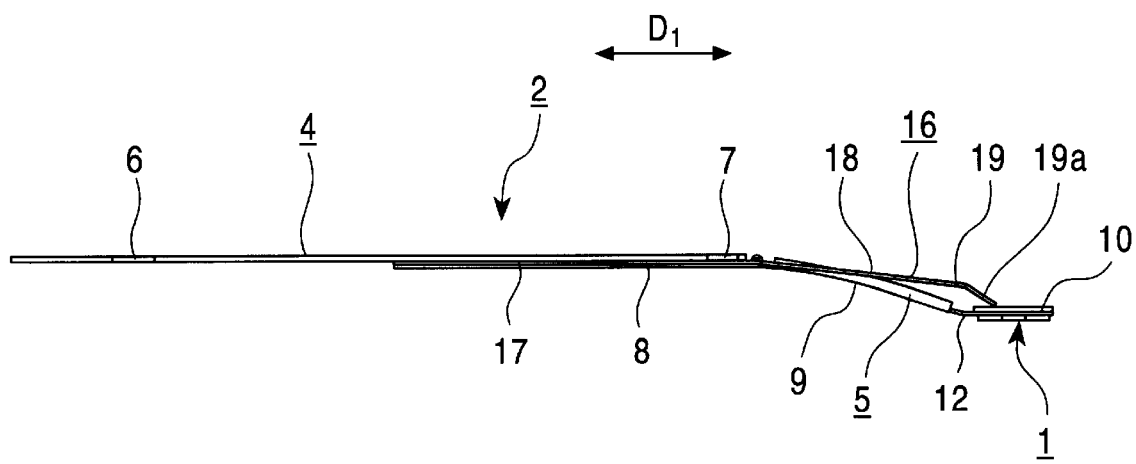
FIG. 8 is a side view showing a state that the base plate shown in FIGS. 1–3, the suspension beam shown in FIGS. 1, 4–5, and the pivot spring shown in FIGS. 1, 6–7 are assembled.

FIGS. 6 and 7 show a pivot spring 16 for giving the suspension beam 5 contact pressure. FIG. 6 is a plan view thereof. FIG. 7 is a side view thereof.

The pivot spring 16 is composed of a base portion 17 having a length of about a half of the entire length of the pivot spring 16, link members 18 extending respectively from the right side edge and the left side edge of the tip edge of the base portion 17 to a further end so as to approach each other, and a pressuring member 19 constructed between both of the ends of the link members 18 to be a single body.

The link members 18 are bent to the base portion 17 of the pivot spring 16 so as to be displaced downward as their positions approach to their ends. Besides, the pressuring member 19 is bent to the link members 18 so as to be displaced downward as its position approaches to its end.

A triangular pressuring portion 19a is formed at the central part of the tip side end of the pressuring member 19 of the pivot spring 16. A cusp portion of the pressuring portion 19a is formed at a position corresponding to the slider-supporting portion 10 of the suspension beam 5.

The base portion 17 of the pivot spring 16 is put between the tip portion of the base plate 4 and the affixed portion 8 of the suspension beam 5. Thereby, the slider-supporting portion 10 of the suspension beam 5 is bent downward by being pressed by the pressuring portion 19a of the pivot spring 16. Thus, a moderate load force is imposed on the flexible magnetic disk 3.

The pivot spring 16 is made from an extremely thin stainless material having a spring constant of about 250 mgf/mm. Consequently, even if the variation of the height of the head slider 1, i.e. the so-called Z-height variation, is produced with the run-out variation of the flexible magnetic disk 3 owing to the low force of 200 mgf imposed on a position of the center of gravity of the head slider 1, the variation width of the load is narrow to be 100–300 mgf, and thereby an even contact pressure is given to each of the contact pads 14 and 15. Consequently, the head slider 1 follows the variations of the repeatable run-out and the non-repeatable run-out of the flexible magnetic disk 3 very well. Thereby, stable recording and stable reproducing can be realized.

Figure 9:
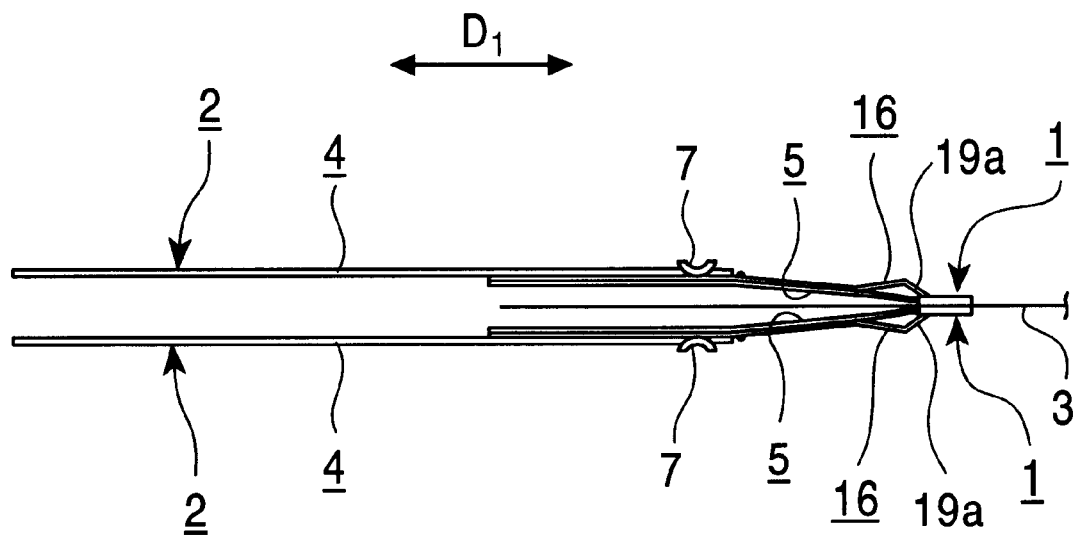
FIG. 9 is a side view showing a state of the flexible magnetic disk shown in FIG. 1 loaded between head sliders shown in FIG. 1 in a state of being pressured on its both of the up face and the down face.
Figure 10:
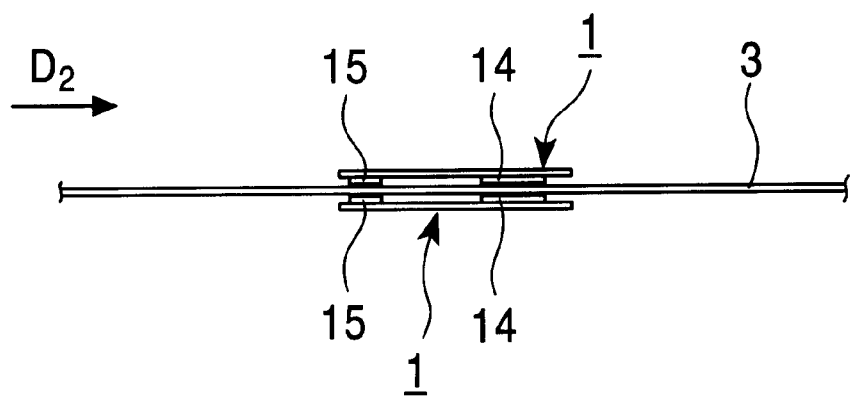
FIG. 10 is a front view showing the state of FIG. 9 viewed from the center of revolution of the flexible magnetic disk.

FIG. 9 is a side view showing a state of the flexible magnetic disk 3 loaded between the head sliders 1 of HGA's 2 in a state of being pressured on its both of the up face and the down face. FIG. 10 is a front view showing enlargedly the head sliders 1 viewed from the front.

Figure 16:
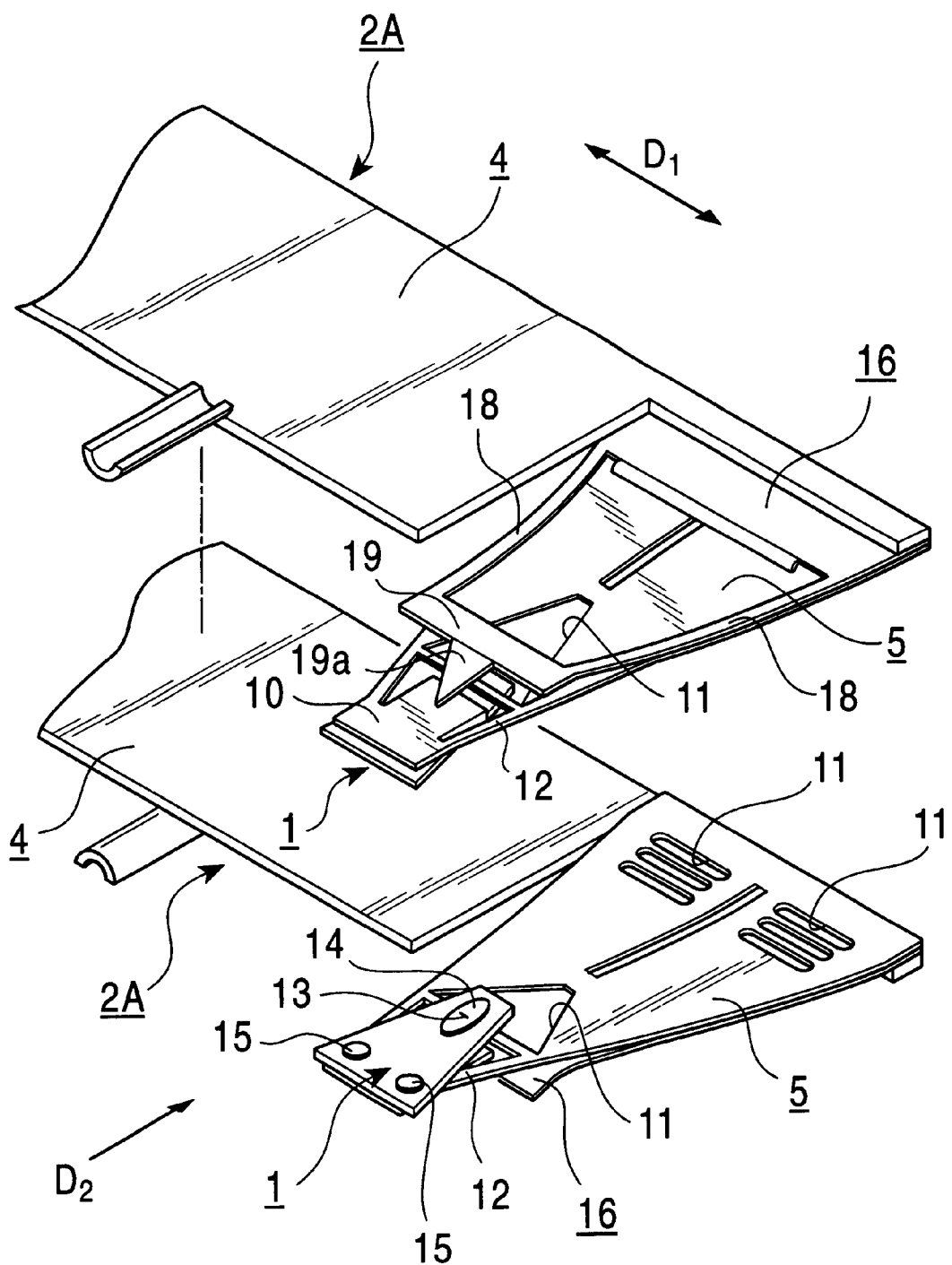
FIG. 16 is a perspective view showing enlargedly a tip portion of an example of a variation of HGA shown in FIG. 1 together with FIG. 17.
Figure 17:
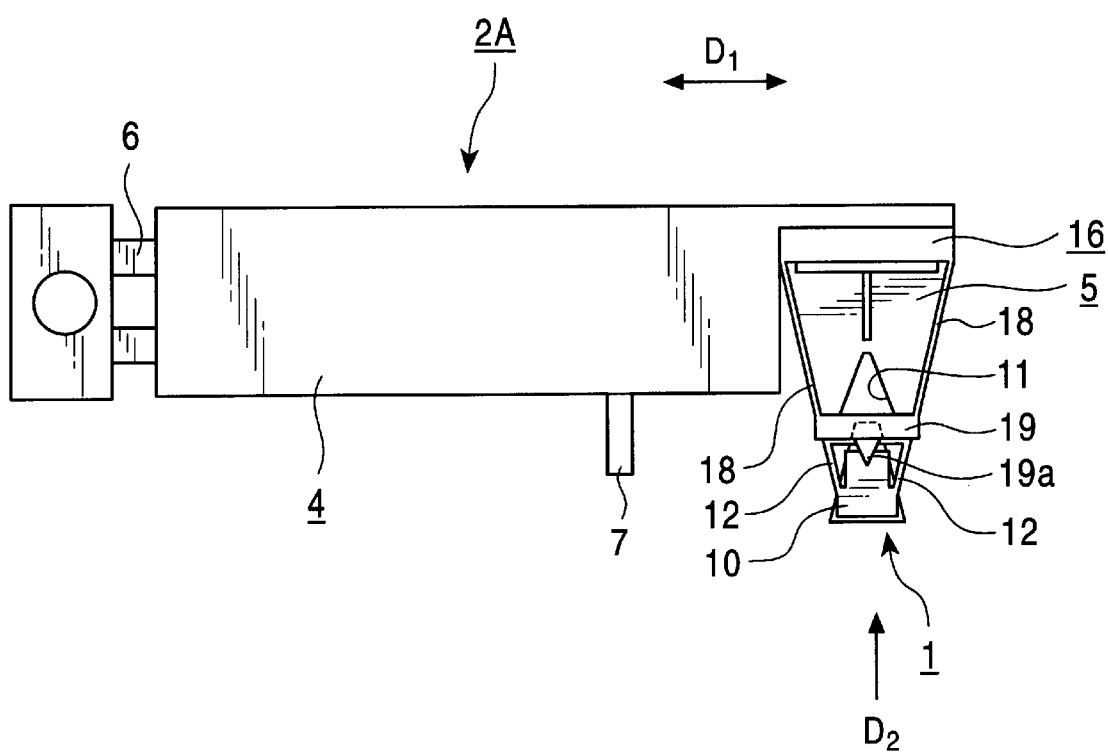
FIG. 17 is a plan view showing the tip portion of the example of the variation of the HGA shown in FIG. 16.

FIGS. 16 and 17 show an example of a variation of the HGA 2A. The example is a type of having a structure where the base plate 4 and the suspension beam 5 are orthogonal to each other. The example of the variation of the HGA 2A has an advantage that the rigidity in the revolution direction of the flexible magnetic disk 3 can be improved.

Incidentally, the descriptions concerning the HGA 2 of the embodiment and the HGA 2A of the example of the variation are given to a type of giving the contact pressure with the pivot spring 16 in both cases. Such a type has an advantage that the dimensional accuracy of the suspension beam 5 can be rough in comparison with a type that the bending of the suspension beam 5 itself is performed to realize the contact pressure. However, the present invention is not limited to the type. The contact pressure may be realized by performing the bending of the suspension beam 5 itself with the enough dimensional accuracy without the pivot spring 16.

Furthermore, in the embodiment, the description is given to the HGA 2 supported by a linear motor (close coupled type actuator). By employing such a linear motor system, the area of an opening of a cartridge (shutter opening) for housing the flexible magnetic disk can be made to be narrower than that of the conventional revolution type actuator system for a hard disk drive. The stability of revolution of the flexible magnetic disk 3, namely the so-called run-out characteristic, and an anti-dust characteristic to fine particles coming from the external circumstances can be improved to that extent. Thereby, the linear motor system is advantageous from a point of view of maintaining the reliability in a removable flexible magnetic disk. However, according to the present invention, the change of the flexible magnetic disk to be a high density one, the change of the transfer rate to be a high speed one and the change of consumption electric power to be low can be realized as main advantages of the present invention though the degree of the attainment differs, even if the revolution type actuator is employed.

For realizing the reliability to the flexible magnetic disk 3, namely for realizing stable recording and reproducing for a long term, it is inevitable to examine the recording and reproducing characteristics, the abrasion of the flexible magnetic disk 3, and the abrasion of the magnetic head 13 simultaneously. Those factors were analyzed and evaluated with the following experimental apparatus.

As a result, it is found that the following specifications are preferable in the head slider 1 and the HGA 2.

TARE OF HEAD SLIDER 1: 500 $\mu$g or less

LOAD FORCE: 400 mgf or less

SUSPENSION SPRING CONSTANT: 1,000 mgf/mm or less

CONTACT PRESSURE BETWEEN FLEXIBLE MAGNETIC DISK 3 AND CONTACT PADS 14 AND 15: 0.001 mgf /$\mu$m$^2$ or more and 0.03 mgf/$\mu$m$^2$ or less ROLL DIRECTION RIGIDITY OF SUSPENSION BEAM 5: 0.8 $\mu$N·m/degree or less PITCH DIRECTION RIGIDITY OF SUSPENSION BEAM: 0.2 $\mu$N·m/degree or less ANGLE $\alpha$ OF CORNER PORTION OF EACH OF CONTACT PADS 14 AND 15 ON THE SIDE OF CONTACTING FLEXIBLE MAGNETIC DISK 3: 115 degrees or more On the above specifications, the inventors of the present invention invented the head slider 1 for a flexible magnetic disk of the invention coping with both having the high density, the high data transfer rate and the high reliability and consuming the low consumption electric power, and further covering the number of revolution of the flexible magnetic disk 3 to be 300 rpm to 5700 rpm.

Figure 18:
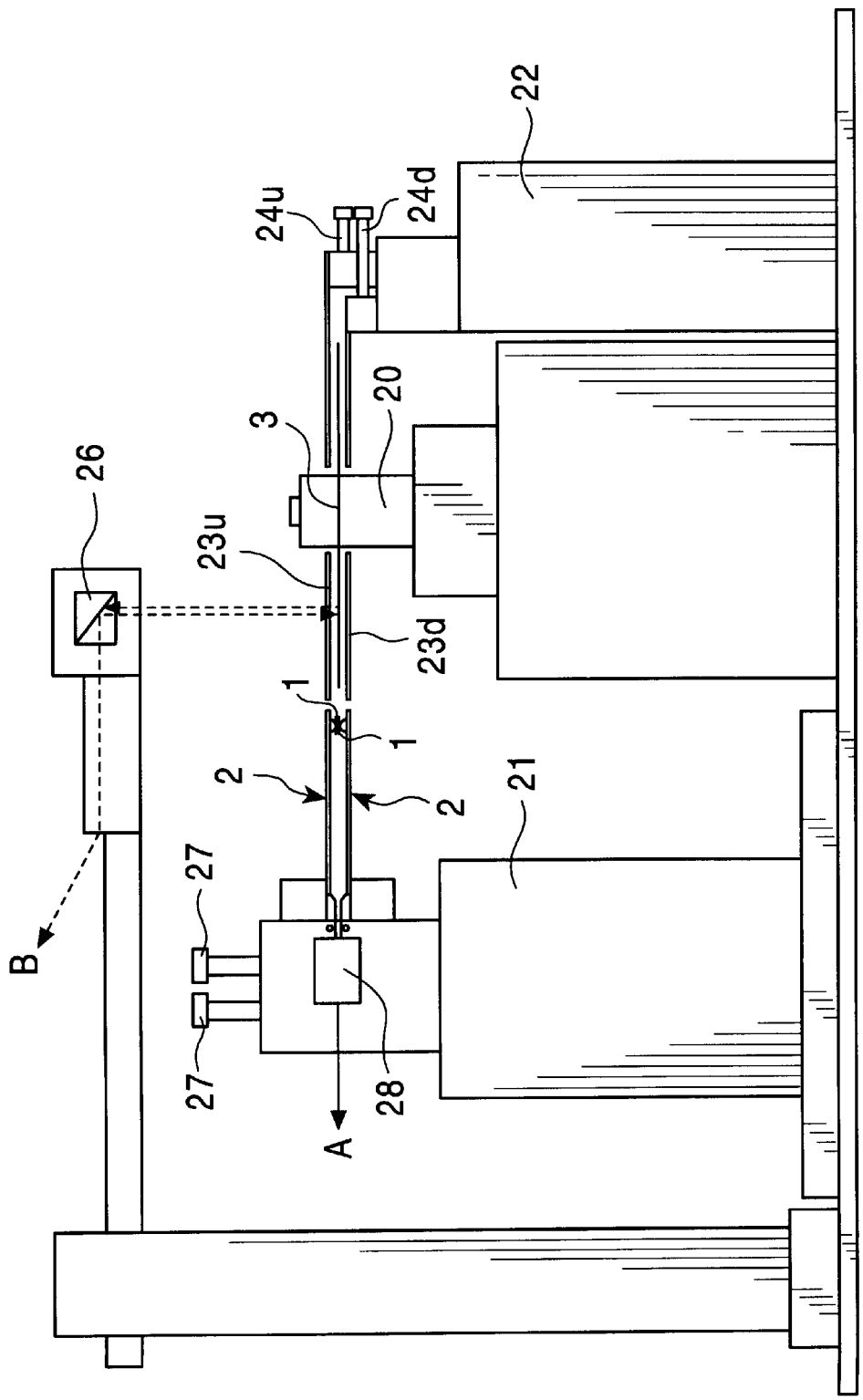
FIG. 18 is a schematic view showing the whole of an experimental apparatus together with FIG. 19.

FIG. 18 is a schematic view showing the experimental apparatus. In the experimental apparatus, a commercially available hard disk spin stand LS 90 made by Kyodo Denshi, Inc. was used as the air spindle motor portion 20 and the head suspension attachment portion 21.

As shown in FIG. 18, glass plates 23u and 23d corresponding to a disk cartridge are disposed on a base jig 22 close to the upside and the downside of the flexible magnetic disk 3. The space between the glass plates 23u and 23d is adjusted with micrometers 24u and 24d. When the flexible magnetic disk 3 is rotated by an air spindle motor portion 20, a laminar flow of air is produced, and at the same time a negative pressure by Bernoulli effect is produced. Thereby, up-and-down motions (hereafter abbreviated to "run-outs") of the flexible magnetic disk 3 are suppressed. The amount of the run-outs can greatly be adjusted by means of the number of revolution of the flexible magnetic disk 3 and the space between the glass plates 23u and 23d.

Figure 19:
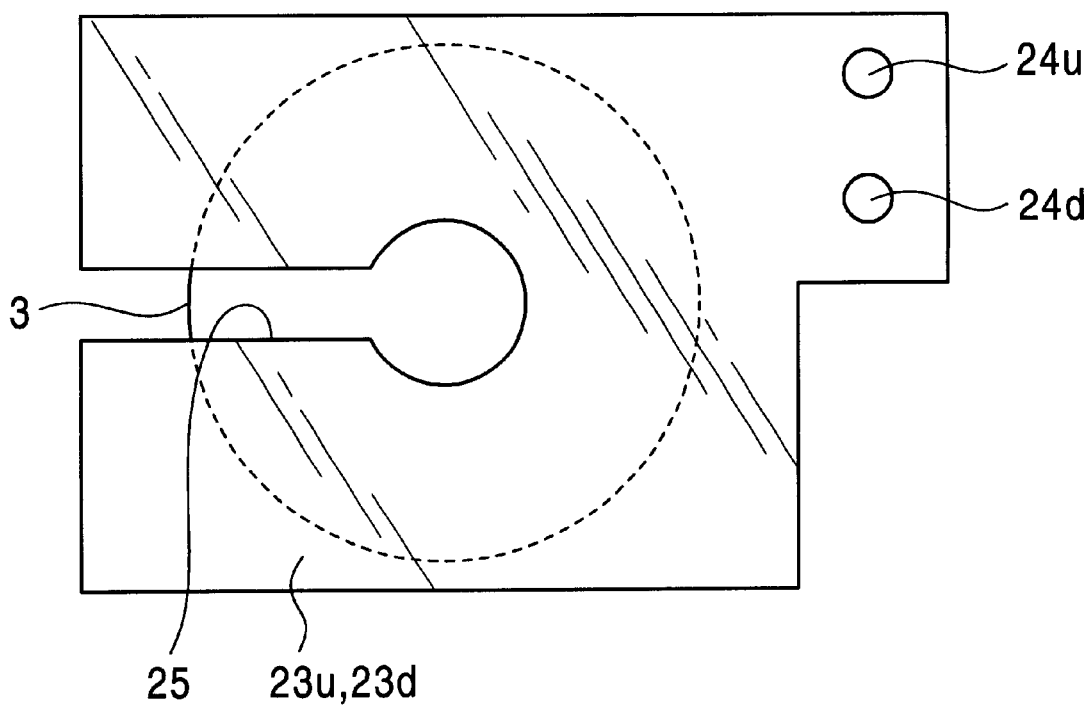
FIG. 19 is a plan view showing a glass plate shown in FIG. 18.

FIG. 19 is a top view of the glass plates 23u and 23d. As apparent from the same figure, each of the glass plates 23u and 23d has a slit 25 for inserting the magnetic head 13, the head slider 1 and the HGA 2. The amount of the run-outs of the flexible magnetic disk 3 can be measured at a real time with an optical system 26 and a laser Doppler microscope apparatus connected to the "B" point in FIG. 18. By the experiment, when the spaces between the flexible magnetic disk 3 and the glass plates 23u and 23d were respectively 300 μm, the good values of the amounts of run-outs (RRO) were obtained to be 15 μm when the magnetic head was unloaded and 10 μm when the magnetic head was loaded.

After the flexible magnetic disk 3 begins to rotate stationarily, the head sliders 1 are loaded in the experimental apparatus in parallel to the surface of the flexible magnetic disk 3 at an arbitrary radial position. Then, the experimental apparatus becomes a state capable of recording and reproducing. In this case, a prescribed value of the Z-height is set in advance with the micrometers 27.

Electromagnetic transformation characteristics of the flexible magnetic disk 3 were analyzed and evaluated with a commercially available record/reproduction evaluation apparatus (Guzik 1601 and PRML), a digital storage oscilloscope (Lecroy 9345) and a spectrum analyzer (Advantest) connected at the "A" point in FIG. 18 through a preamplifier 28 (SSI 2010).

On the other hand, a stratified coated type magnetic recording flexible disk was used as the flexible magnetic disk 3. The used flexible disk has an under layer composed of a non-magnetic substrate and non-magnetic powder dispersed in a binder coated on the non-magnetic substrate, and an over magnetic layer composed of ferromagnetic powder dispersed in a binder coated on the non-magnetic under layer while the non-magnetic layer of the under layer is not yet dried. The average thickness of the magnetic layer of the flexible disk is 0.2 μm after the calendar processing thereof.

However, as the flexible magnetic disk 3 of the present invention, a coated type single layer flexible magnetic disk and a metallic thin film flexible magnetic disk the thin film of which is made by an evaporation process or a sputtering process may be applicable as long as they have high S/N ratios. That is, the kind or the structure of the flexible magnetic disk 3 is not limited to the stratified coated type magnetic recording flexible disk.

At first, the description will be given to the relative speed dependency of the record/reproduction characteristics of the head slider 1 according to the present invention.

Figure 20:
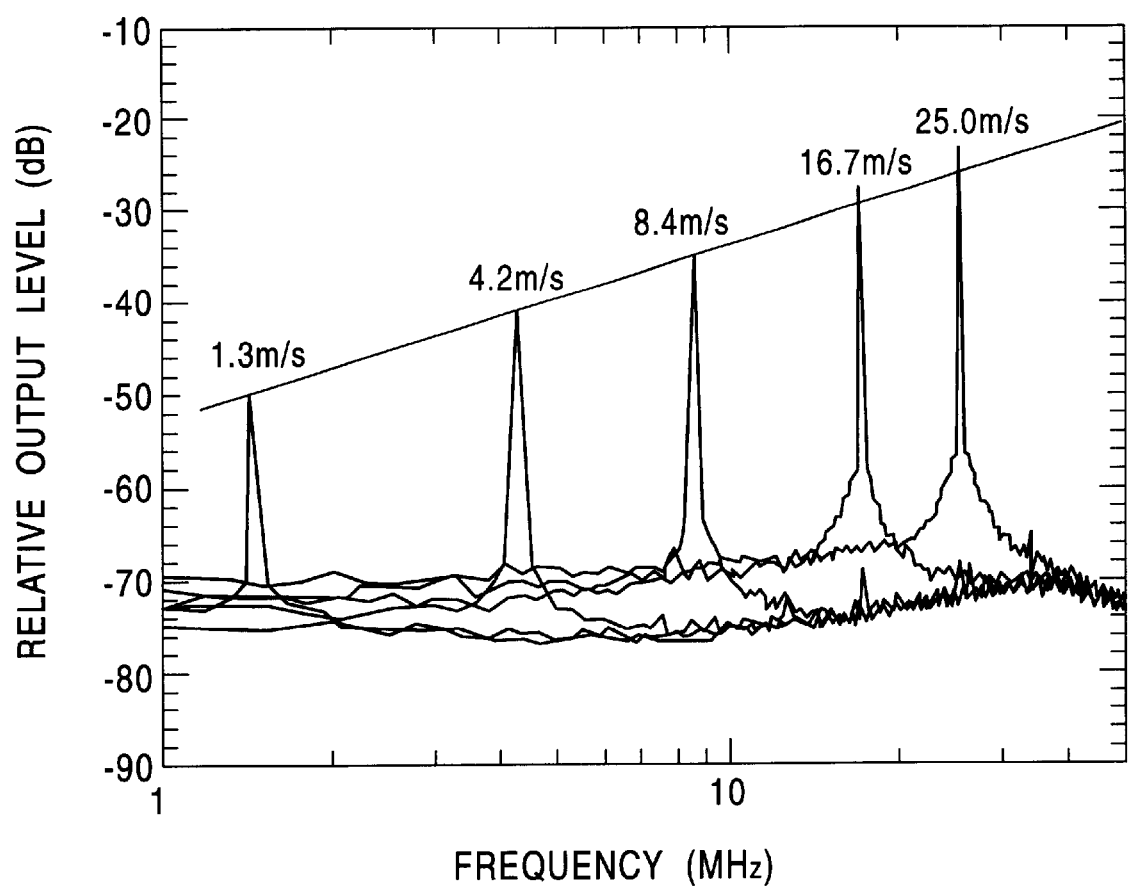
FIG. 20 is a graph showing the dependency of a half Nyquist single signal (=59 kbpi) having a line recording density 118 kbpi to a relative speed.

FIG. 20 shows the relative speed dependency of a half Nyquist single signal (=59 kbpi) having a line recording density of 118 kbpi. The relative speed was controlled in conformity with the variation of the number of revolution of the flexible magnetic disk 3. The position of the magnetic head 13 was set at the most outer periphery portion of the 3.5-inch flexible magnetic disk, or a radial position of 42 mm. From the same figure, it is known that record/reproduction outputs are on the so-called +6 dB/Oct. line directly proportional to the relative speeds within the scope of 1.3 m/s (=300 rpm) to 25 m/s (=5,680 rpm). Incidentally, the reason why the record/reproduction outputs are somewhat larger within the scope of 16.7 m/s to 25 m/s is the influence of the raise of the gain of the amplifier. The data showing the direct proportion indicate the realization of a state that the magnetic spacing amount between the magnetic head 13 and the flexible magnetic disk 3 is fixed within the aforesaid scope and the head slider 1 is stably contacting without floating.

Furthermore, because the magnetic head 13 according to the present invention realizes the completely contacting type head-disk interface to the flexible magnetic disk 3, the magnetic head 13 can completely contact with the flexible magnetic disk 3, even if the relative speed is 1.3 m/s or less, as long as the relative speed is larger than 0.

Next, the description will be given to reliability and durability.

Variations of the contacting state of the magnetic head 13 with the flexible magnetic disk 3 was monitored by means of amplitudes IS TAA's from a base line (=GND) to peaks of isolated reproduction waveforms of a wavelength of 10 μm and values of pulse widths PW 50's at the half levels of the IS TAA's. Generally, the IS TAA is used as an indicator of an S/N ratio, and the PW 50 is used as an indicator of a contacting state because the PW 50 is very sensitive to the magnetic spacing amount between the magnetic head and the flexible magnetic disk.

Figure 21:
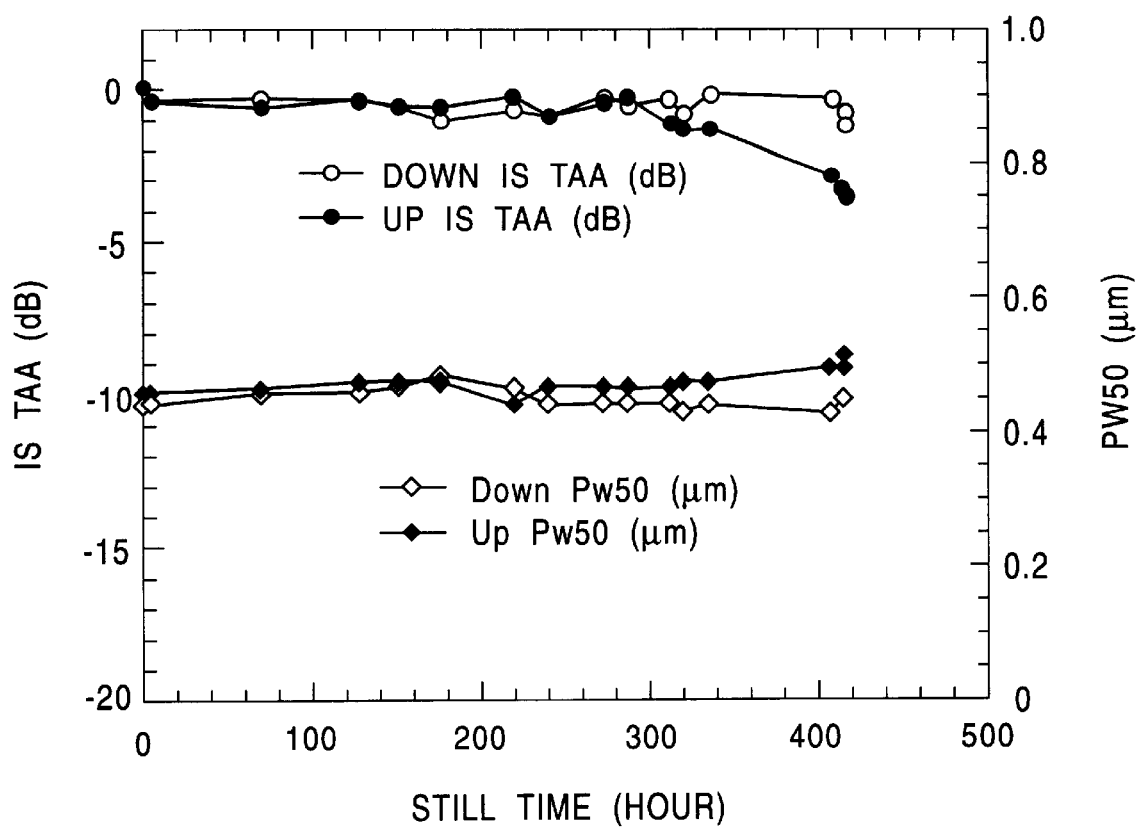
FIG. 21 is a graph showing variations of a contact state between the magnetic head shown in FIG. 1 and the flexible magnetic disk shown in FIG. 1 by means of amplitudes IS TAA's and the pulse width PW 50's at half levels of the IS TAA's as indicators.

FIG. 21 shows experimental data of an embodiment of the invention when one-track still reproduction of the flexible magnetic disk 3 was performed for 420 hours under an environmental condition of the room temperature and the room humidity. From the same figure, some deterioration of signal quality can be recognized on the up face side. However, it is known that the drops of the outputs are within 3 dB and the experimental data show fully high reliability.

The evaluations of the damages of the flexible magnetic disk 3 and the powder fall level of the contact pads 14 and 15 were performed by observing the flexible magnetic disk 3 with an optical microscope after performing one track still reproduction of the flexible magnetic disk 3 for 60 hours under the environmental condition of the room temperature and the room humidity. The degrees of the damages were classified into six steps of classes 1–6 in the evaluations. The class 1 corresponding substantially to the fall of 1 dB of the S/N ratio of the recording and reproducing characteristics was set to be a limit for actual use as the influence to the recording and reproducing characteristics.

<RELIABILITY TEST CONDITIONS (STILL/SEEK)>

CIRCUMSTANCES: room temperature and room humidity (25° C., 60% RH)

NUMBER OF REVOLUTION OF DISK: 4,000 rpm (CW)

HEAD LOADING POSITION (STILL): radial position of 37 mm

HEAD LOADING POSITION (SEEK): radial range of 30–40 mm

HEAD/DISK RELATIVE SPEED: 13.7 m/s

STILL TIME: 60–420 hours

SEEK TIME: 50 hours

NUMBER OF TOTAL PASS (STILL): 17 million to 84 million passes

NUMBER OF TOTAL PASS (SEEK): 2 million passes

HEAD LOAD FORCE: 200 mgf

MAGNETIC HEAD: planar type thin film magnetic head

TRACK WIDTH: 4.5 $\mu$m

FLEXIBLE MAGNETIC DISK: 3.5-inch thin layer MP disk

AMOUNT OF DISK RUN-OUT: 15 $\mu$mpp or less

Z-HEIGHT: 34 mil (0.78 mm)

Figure 22:
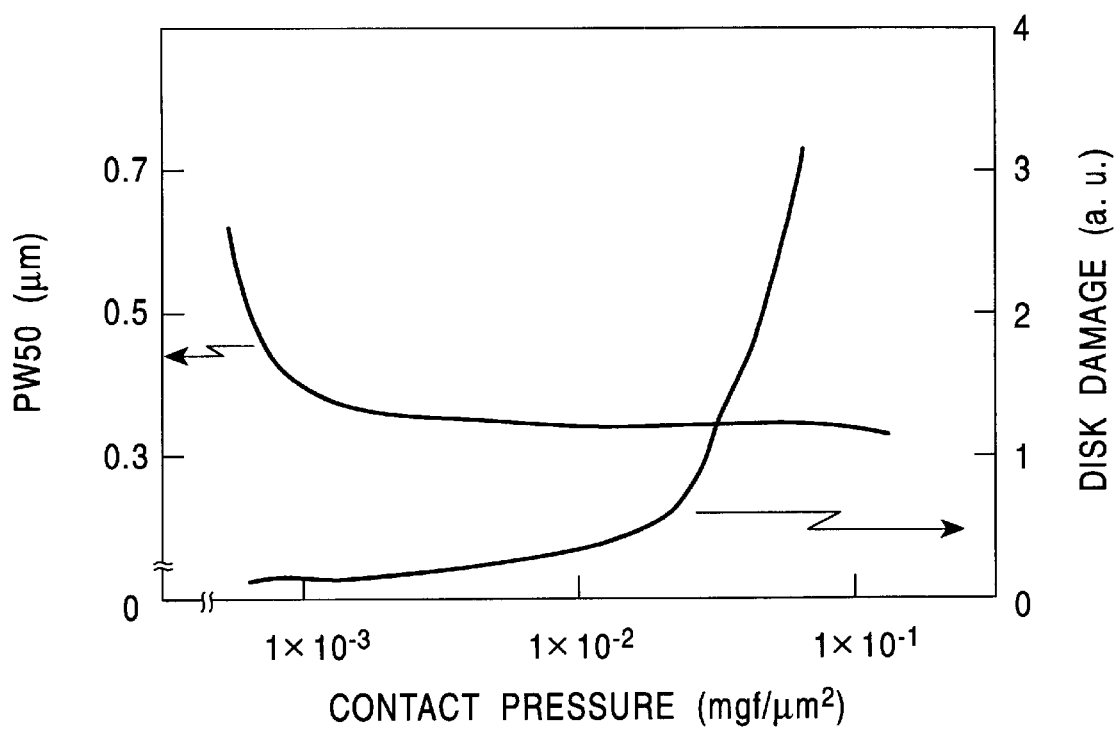
FIG. 22 is a graph showing the dependency of the PW 50's and disk damages to contact pressures.

FIG. 22 shows the dependency of PW 50's and disk damages against contact pressures. The contact pressures were controlled by means of variations of the area of the contact pad. From the same figure, it is known that the PW 50 becomes large in a range of the contact pressures of $1 \times 10^{-3}$(mgf/$\mu$m$^2$) or less to indicate that the contact pressure of the magnetic head 3 is too low to maintain sufficient contact of the magnetic head 3. It is also known that the disk damages exceed the class 1 in a rage of the contact pressures of $1 \times 10^{-2}$(mgf/$\mu$m$^2$) or more owing to too high contact pressures to keep the reliability of the magnetic head 3.

Figure 23:
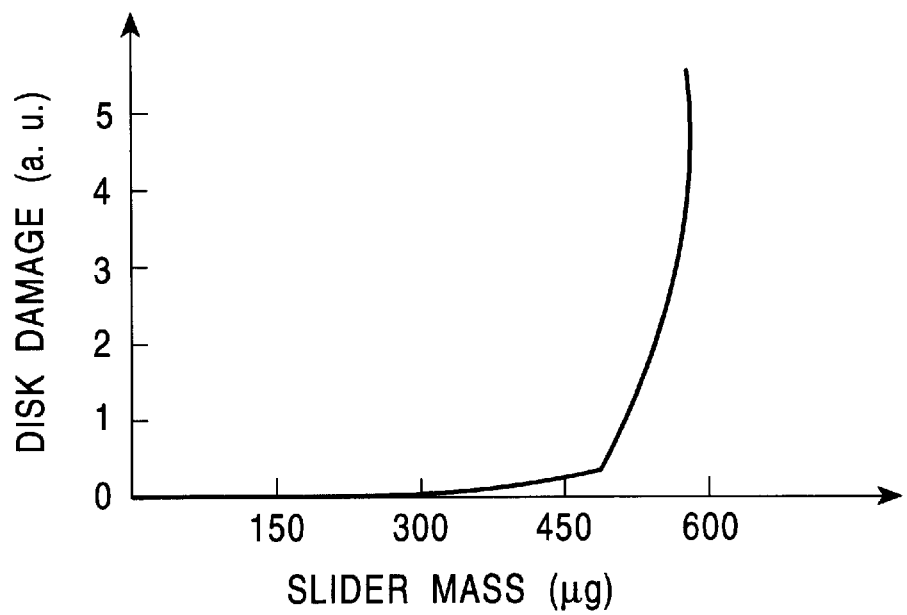
FIG. 23 is a graph showing a relationship between the weights of the head slider shown in FIG. 1 and the scratch disk damages.

FIG. 23 shows a relationship between weights of the head slider 1 and disk scratch damages in impact resistance tests. The test method is as follows. That is, first, imposing the acceleration of 500 G perpendicularly on a surface of a flexible magnetic disk 3 loaded between head sliders 1 from the outside, and then quantifying the scratch damages on the surface of the flexible magnetic disk 3 on a basis similar to the aforementioned. From the same figure, it is known that the disk damages of the flexible magnetic disk 3 exceed the class 1 to make it impossible to maintain the reliability of the magnetic disk apparatus unless the tare or slider weight of the head slider 1 is 500 $\mu$g or less.

Figure 24:
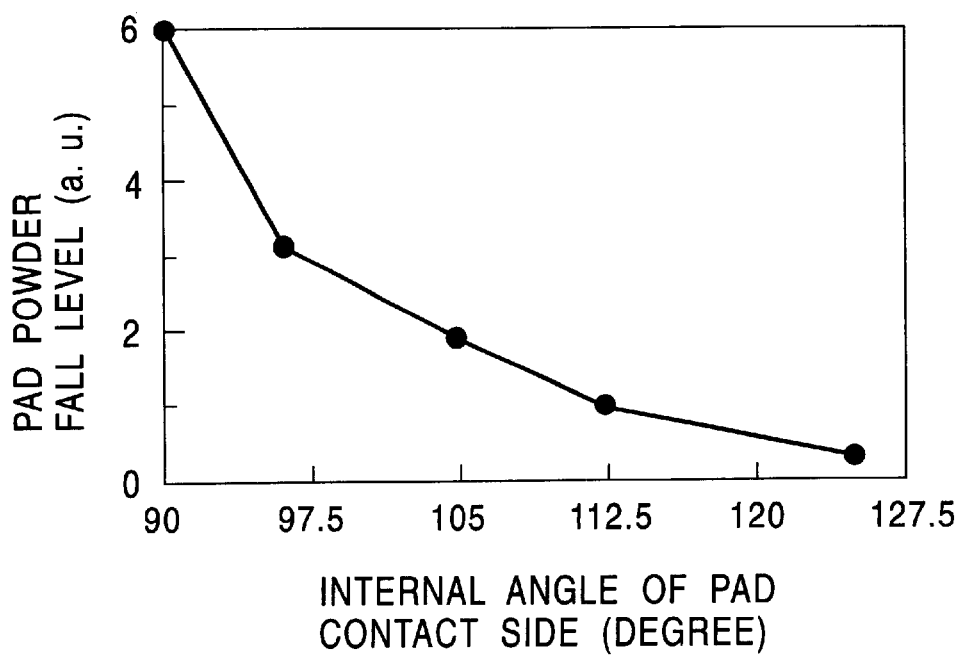
FIG. 24 is a graph showing a relationship between angles of a corner portion of the contact pad on the side of contacting the flexible magnetic disk and powder fall levels of the contact pad.

FIG. 24 shows a relationship between angles $\alpha$ of a corner portion of each of the contact pads 14 and 15 on the sides of contacting the flexible magnetic disk 3 and powder fall levels of the contact pads 14 and 15 under the condition of the maximum contact pressure of $3 \times 10^{-2}$ mgf/$\mu$m$^2$. From the same figure, it is known that the effect of scraping the surface of the flexible magnetic disk 3 is too high in a region of the acute angles of the corner portion of each of the contact pads 14 and 15 being 115 degrees or less to admit the resulting too large powder fall levels from a point of view of the long term reliability of the magnetic disk apparatus.

Figure 25:
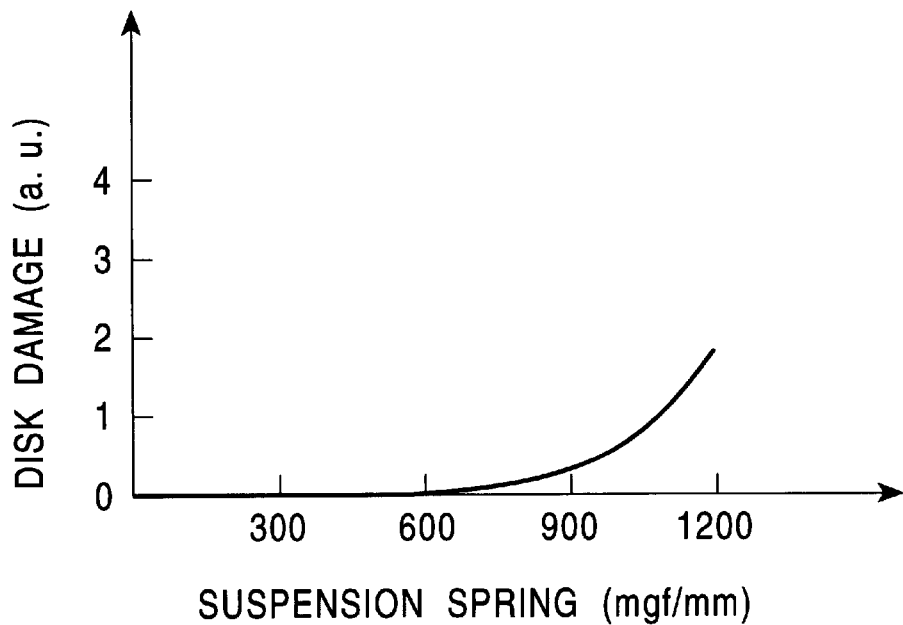
FIG. 25 is a graph showing a relationship between suspension spring constants and disk damages.

FIG. 25 shows a relationship between suspension spring constants, i.e. suspension beam spring constants plus pivot spring constants, to the head slider 1 and disk damages. The experiment was performed in a state of still reproduction for 60 hours under circumstances of the room temperature and the room humidity. From the same figure, it is known that the disk damages exceed the class 1 when the suspension spring constants is 1,000 mgf/mm or more. The meaning of the data is supposed as follows. That is, the tendency of the head slider 1 to overbear the flexible magnetic disk 3 to its loaded position is strengthened as the spring constant is raised. Then, the contact pressure of a part of the contact pads 14 and 15 becomes too high to run-out variations of the flexible magnetic disk 3 or the Z-height deviations owing to the attachment errors of the head slider 1, and the too high contact pressure gives the flexible magnetic disk 3 the scratch damages. From the above results, it is known that the suspension spring constant needs to be 1,000 mgf/mm or less, preferably 500 mgf/mm or less.

Furthermore, the lower the load force of the head slider 1 is, the more preferable it is from a point of view of the spindle motor consumption electric power. However, the load force needs to be within a certain extent from a point of view of servo performance.

Figure 28:
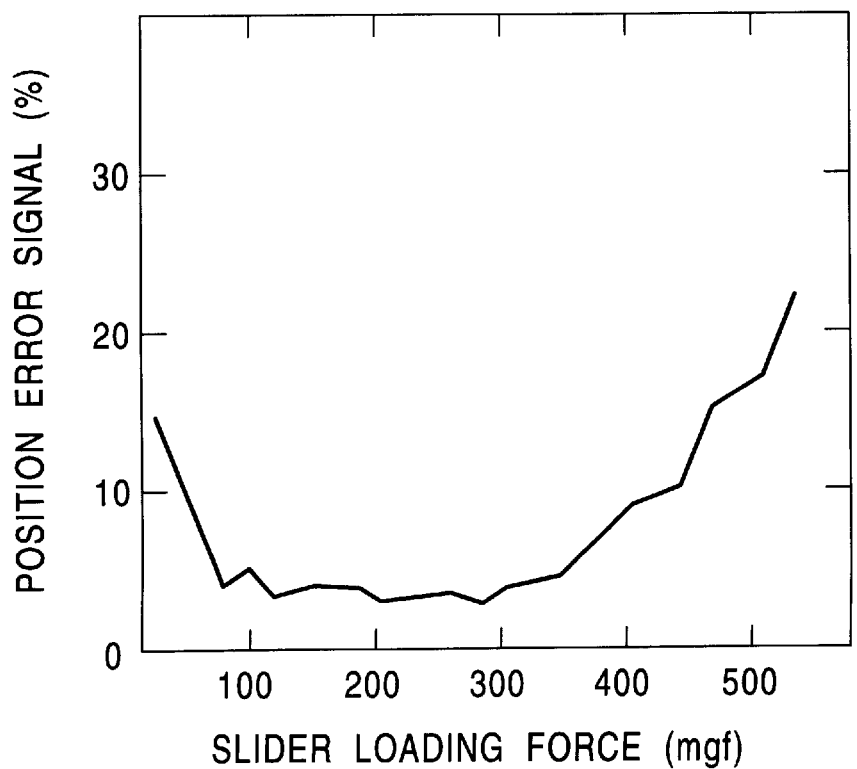
FIG. 28 is a graph showing the dependency of position error signals to load forces.

FIG. 28 shows experimental results of dependency of position error signals to load forces in a case of performing tracking control in an embedded type sector servo system.

Experimental conditions are: number of revolution: 3,600 rpm; track pitch: 5.5 $\mu$m; number of sectors: 96; sampling frequency: 5 MHz.

An LSI (SSI 32P 4129B made by SSI, Inc.) was used. The control of operation of the experimental apparatus was performed in conformity with PID control by means of software.

From FIG. 28, it is known that the position error exceeds 10% in regions of load forces of 400 mgf or more and 40 mgf or less. This is why the frictional force becomes too strong in the region of the load force of 400 mgf or more. Then, it becomes hard that the linear actuator moves. Consequently, non-linear phenomena grow strong. Accordingly, it becomes impossible to control the head slider 1 linearly. On the other hand, the load force becomes too light in the region of the load force of 40 mgf or less. Then, the effect that the head slider 1 suppresses the run-outs of the flexible magnetic disk 3 becomes little. Consequently, the amount of off-tracking to the tracking direction of the slider head 1 becomes increased. And thereby, the position error becomes enlarged.

From the aforesaid description and the results of the experiment, it is known that it is necessary that the load force is within a range of 40–400 mgf and it is preferable to be 80–300 mgf.

Figure 26:
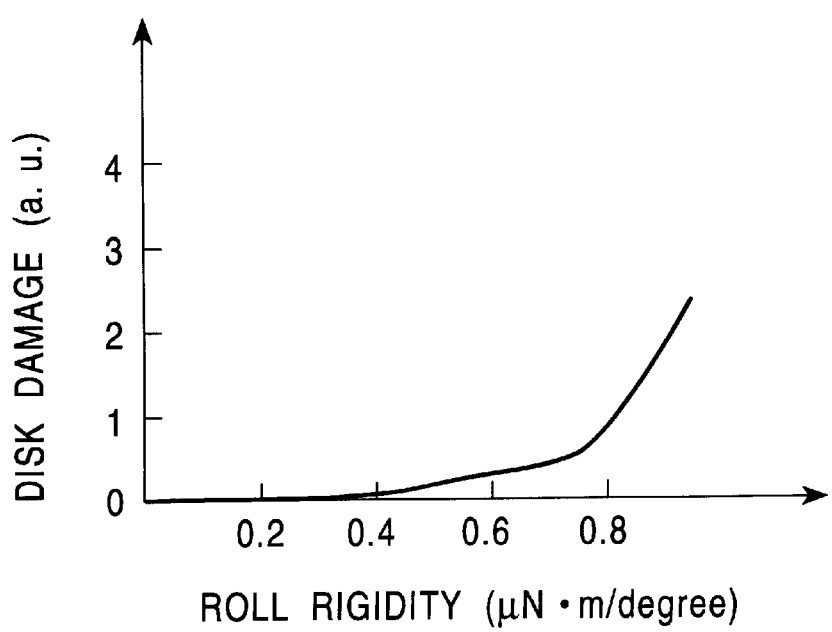
FIG. 26 is a graph showing a relationship between roll direction rigidities of the suspension beam shown in FIG. 1 and disk damages.

FIG. 26 shows a relationship between the roll direction rigidities of the suspension beam 5 and disk damages. The "roll direction" means the "$D_3$" direction in FIGS. 11 and 12. In the experiment, continuous seek operations of the head slider 1 were repeated 200 million times for 50 hours under circumstances of the room temperature and the room humidity. From the same figure, it is known that the disk damages exceed the class 1 when the roll direction rigidities exceed 0.8 $\mu$N·m/degree or more. This result can be supposed that the following ability of the head slider 1 to the surface of the flexible magnetic disk 3 is lost against the variations of run-outs of the flexible magnetic disk 3 owing to the rise of the roll direction rigidities. Then, the head slider 1 declines from side to side to the running direction non-synchronously to the run-outs. As a result, a contact pressure of a part of the contact pads 14 and 15 is especially raised, and thereby scratch damages are given to the flexible magnetic disk 3. From the above description, the roll direction rigidities are preferably to be 0.8 $\mu$N·m/degree or less, especially it is preferable to be 0.4 $\mu$N·m/degree or less.

Figure 27:
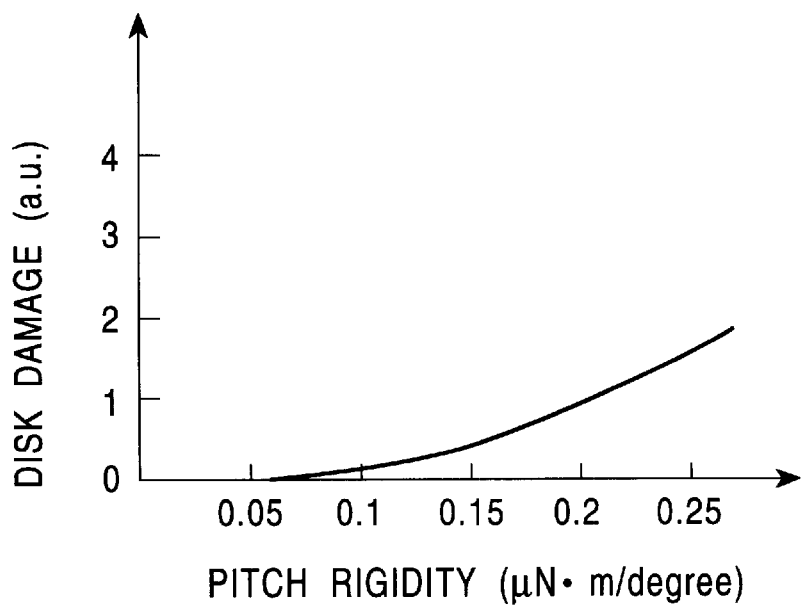
FIG. 27 is a graph showing a relationship between pitch direction rigidities of the suspension beam shown in FIG. 1 and disk damages.

FIG. 27 shows a relationship between the pitch direction rigidities of the suspension beam 5 and disk damages. The "pitch direction" means the "$D_4$" direction in FIGS. 11–13. In the experiment, continuous seek operations of the head slider 1 were repeated 200 million times for 50 hours under the circumstances of the room temperature and the room humidity. From the same figure, it is known that the disk damages exceed the class 1 when the pitch direction rigidities exceed 0.2 $\mu$N·m/degree or more. This result can be supposed that the following ability of the head slider 1 to the surface of the flexible magnetic disk 3 is lost against the variations of run-outs of the flexible magnetic disk 3 owing to the rise of the pitch direction rigidities. Then, the head slider 1 declines back and forth to the running direction non-synchronously to the run-outs. As a result, a contact pressure of a part of the contact pads 14 and 15 is especially raised, and thereby scratch damages are given to the flexible magnetic disk 3. From the above description, the pitch direction rigidities are preferably to be 0.2 $\mu$N·m/degree or less, especially it is preferable to be 0.1 $\mu$N·m/degree or less.

Consequently, there is obtained a result that the head slider 1 having the following conditions is most preferable for coping with the preferable electromagnetic transformation characteristics and the preferable reliability and durability.

TARE OF HEAD SLIDER 1 OF THE PRESENT INVENTION: 500 $\mu$g or less

LOAD FORCE: 400 mgf or less

SUSPENSION SPRING CONSTANT: 1,000 mgf/mm or less

CONTACT PRESSURE BETWEEN FLEXIBLE MAGNETIC DISK 3 AND CONTACT PADS 14 AND 15: 0.001 mgf/$\mu$m or more and 0.03 mgf/$\mu$m$^2$ or less ROLL DIRECTION RIGIDITY OF SUSPENSION BEAM 5: 0.8 $\mu$N·m/degree or less PITCH DIRECTION RIGIDITY OF SUSPENSION BEAM 5: 0.2 $\mu$N·m/degree or less ANGLE $\alpha$ OF EACH OF CORNER PORTIONS OF CONTACT PADS 14 AND 15 ON THE SIDE OF CONTACTING FLEXIBLE MAGNETIC DISK 3: 115 degrees or more From the aforesaid description, such a flexible magnetic disk apparatus can be realized by the head slider 1 for the flexible magnetic disk 3 according to the present invention as has a relative speed 15 times or more as fast as the conventional flexible magnetic disk apparatus spread widely and having a recording capacity of 1.4 Mbytes, a high recording density, a high transfer rate and is a power saving type.

Incidentally, the description is given to an embodiment having three contact pads. However, the number of the contact pads is not limited to the number in the present invention. For example, one contact pad will do. And a plurality of contact pads are also will do. In a case of having one contact pad, the contact pad may be applicable to the present invention as long as it is a magnetic pole pad. In a case of having a plurality of contact pads, they are applicable to the present invention as long as one of them is a magnetic pole pad.

In addition, concrete shapes and structures of respective portions shown in the aforesaid embodiment indicate only examples of realization in a case of embodying the present invention, and accordingly, the scope of the present invention should not be interpreted on the basis of the aforesaid shapes and structures limitedly.

What is claimed is:

1. A head slider having a magnetic head for recording a signal on a flexible magnetic disk or reproducing the recording signal from the flexible magnetic disk, comprising:

a pad disposed on a surface of said head slider opposed to the flexible magnetic disk, said pad including the magnetic head embedded in said pad, wherein the magnetic head performs the recording of the signal on the flexible magnetic disk or the reproducing of the signal from the flexible magnetic disk in a state that said pad contacts the flexible magnetic disk rotating at a relative speed of 0 m/s or more and 25.0 m/s or less to the magnetic head, and wherein a tare of said head slider is 500 $\mu$g or less, a load force of said head slider is 400 mgf or less, and a contact pressure between said pad and said flexible magnetic disk is 0.001 mgf/$\mu$m$^2$ or less.

2. A head slider according to claim 1, wherein said relative speed is 1.3 m/s or more and 25.0 m/s or less.

3. A head slider according to claim 1, wherein a spring constant of a suspension for supporting said head slider is 1,000 mgf/mm or less.

4. A head slider according to claim 3, wherein roll direction rigidity of said suspension is 0.8 $\mu$N·m/degree or less.

5. A head slider according to claim 4, wherein pitch direction rigidity of said suspension is 0.2 $\mu$N·m/degree or less.

6. A head slider according to claim 5, wherein an angle of a corner portion of said pad on a side of contacting said flexible magnetic disk is 115 degrees or more.

7. A head slider according to claim 4, wherein an angle of a corner portion of said pad on a side of contacting said flexible magnetic disk is 115 degrees or more.

8. A head slider according to claim 3, wherein pitch direction rigidity of said suspension is 0.2 $\mu$N·m/degree or less.

9. A head slider according to claim 8, wherein an angle of a corner portion of said pad on a side of contacting said flexible magnetic disk is 115 degrees or more.

10. A head slider according to claim 3, wherein an angle of a corner portion of said pad on a side of contacting said flexible magnetic disk is 115 degrees or more.

11. A head slider according to claim 1, wherein roll direction rigidity of a suspension for supporting said head slider is 0.8 $\mu$N·m/degree or less.

12. A head slider according to claim 11, wherein pitch direction rigidity of said suspension is 0.2 $\mu$N·m/degree or less.

13. A head slider according to claim 12, wherein an angle of a corner portion of said pad on a side of contacting said flexible magnetic disk is 115 degrees or more.

14. A head slider according to claim 11, wherein an angle of a corner portion of said pad on a side of contacting said flexible magnetic disk is 115 degrees or more.

15. A head slider according to claim 1, wherein pitch direction rigidity of a suspension for supporting said head slider is 0.2 $\mu$N·m/degree or less.

16. A head slider according to claim 15, wherein an angle of a corner portion of said pad on a side of contacting said flexible magnetic disk is 115 degrees or more.

17. A head slider according to claim 1, wherein an angle of a corner portion of said pad on a side of contacting said flexible magnetic disk is 115 degrees or more.

* * * * *